May 13, 1958 D. R. PARDUE ET AL 2,834,236
SOUND INTENSITY MEASUREMENT
Filed Oct. 12, 1956

INVENTORS,
DON R. PARDUE
ALBERT L. HEDRICH
BY
W. E. Thibodeau, A. W. Breu, J. P. Edgerton
& T. J. Mackavanagh
Attorneys.

2,834,236

SOUND INTENSITY MEASUREMENT

Don R. Pardue, Silver Spring, and Albert L. Hedrich, Bethesda, Md.

Application October 12, 1956, Serial No. 615,727

2 Claims. (Cl. 181—.5)

(Granted under Title 35, U. S. Code (1952), sec. 266)

The invention described herein may be manufactured and used by or for the Government for governmental purposes without the payment to us of any royalty thereon.

This invention relates to means for measuring sound intensity and particularly to an absolute method for measuring sound intensity.

It is an object of this invention to provide means whereby temperature fluctuations produced by a low frequency sound may influence a supersonic sound of a fixed frequency to produce a phase difference between a pair of transducers, and between which the supersonic sound is transmitted, so that the intensity of the low frequency sound may be read directly by a calibrated meter.

It is an object of this invention to produce a fixed frequency supersonic sound propagated in air between two transducers spaced a known distance apart, to influence this supersonic sound by a low frequency sound, to measure the phase difference in the supersonic sound between the transducers produced by the low frequency sound, and to provide means whereby the temperature variations in the low frequency sound are read directly as sound intensity in a calibrated meter.

It is an object of this invention to provide supersonic sound means connected to associated equipment for directly measuring the sound intensity of a low frequency sound.

It is also an object of this invention to provide supersonic sound means responsive to low frequency sounds to simulate a microphone and to have a flat frequency response of from zero to several thousand cycles.

The specific nature of the invention as well as other objects, uses and advantages thereof will clearly appear from the following description and from the accompanying drawing, in which.

Figure 1:
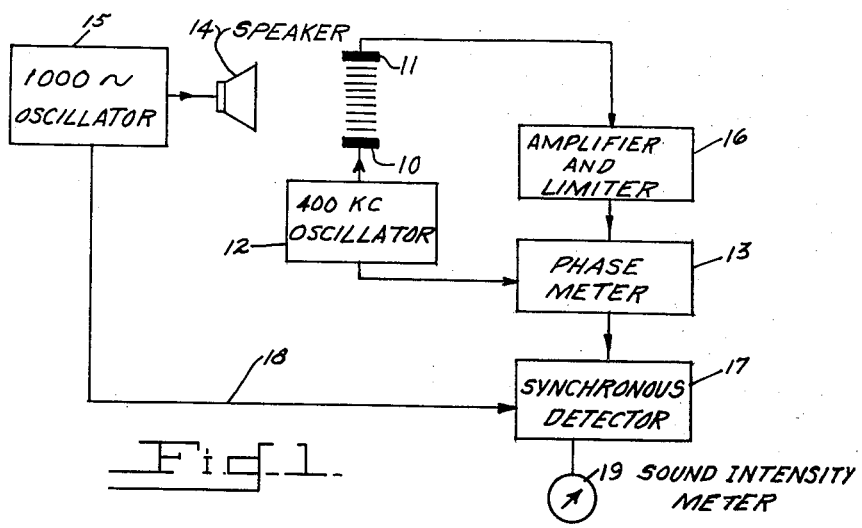
Figure 1 is a block diagram of means for subjecting a supersonic sound to the influence of low frequency sound so that the intensity of the low frequency sound can be read directly.

In the block diagram of Figure 1, there is shown a pair of crystals, of which crystal 10 is the transmitting crystal and crystal 11 is the receiving crystal, and both crystals are connected with a source of supersonic sound 12 having a frequency of 400 kilocycles. In an experimental set-up for this supersonic frequency the crystals are rod-like, and have a flat face of about ¼ inch diameter, and they are in spaced opposed relation and about two inches apart. These dimensions are given by way of illustration and not by way of limitation.

The supersonic frequency may be increased to a megacycle provided that the size of the crystals is reduced.

A speaker 14 is connected to a source 15 of 1000 cycles, and the sound emitted by the speaker is directed in the neighborhood of the supersonic sound wave, so that the supersonic signal at the receiver crystals will not be in step with that leaving the transmitter crystal. The two crystals 10 and 11 are connected to a conventional phase meter 13, and the output of this phase meter will, of course, indicate this difference in phase. A conventional amplifier and limiter 16 may be interposed between the receiver crystal and the phase meter.

The spacing between the crystals should be small compared to the wave length of the sound from the speaker, and the size of the crystals should also be small compared to the wave length of the sound from the speaker.

Sound transmission is an adiabatic process, which means that the pressure fluctuations due to a sound wave are accompanied by temperature fluctuations which are related to the sound intensity, and it follows that if the temperature fluctuations are measured then the sound intensity can be readily calculated. The phase meter 13 indicates the phase difference of voltages on the two crystals. This phase difference depends upon the velocity of sound propagation and hence upon the temperature in the air between the two crystals. When the sound from the speaker passes between the transducers the phase difference will fluctuate at the 1000 cycle rate of the sound emitted by the speaker. The magnitude of the phase fluctuations will depend upon the sound intensity at 1000 cycles. It will also depend upon the spacing between the transducers and upon the transducers orientation with respect to the 1000 cycle wave but in the present disclosure the angle between the crystals is zero to simplify matters.

The output of the phase meter 13 is fed to a conventional synchronous detector 17 having a control from the 1000 cycle oscillator 15 over a wire 18. The output of the synchronous detector 17 is fed to a meter 19 having a scale calibrated in sound intensity so that the meter reads sound intensity directly, that is, when the parameters are not changed during a given set of test conditions for which the meter was calibrated.

In one laboratory test the phase meter gave a peak to peak output of 60 volts for a sound intensity of one watt per square centimeter. This is an extremely high sound intensity, but intensities low enough to produce a phase meter output of the order of only a millivolt, or even less, may be easily measured if a synchronous rectifier, driven by the 1000 cycle voltage is used.

The system just described can obviously be used to compare the response of the speaker 14 at different sound frequencies by feeding the speaker the same power at different frequencies in the oscillator 15.

Figure 2:
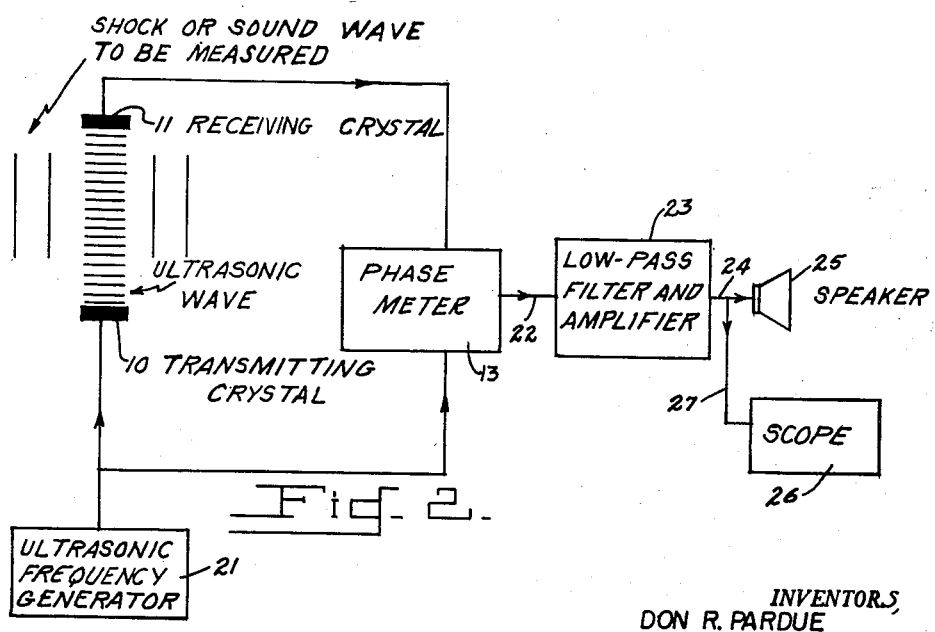
Figure 2 is a block diagram of means for employing a supersonic sound to indicate the intensity of low frequency sounds and to give a flat response curve from zero cycles to several thousand cycles.

In a modification of the system just described, and shown in the block diagram of Figure 2, the crystals 10 and 11 are fed with energy at ultrasonic frequency from a source 21, and are connected to the conventional phase meter. The output of the phase meter passes by a wire 22 to a conventional low pass filter and amplifier, indicated at 23, and the output of the amplifier passes by a wire 24 to a speaker 25. An oscilloscope 26 may be tapped onto the wire 24 by a wire 27.

In the modified system of Figure 2, the ultrasonic wave may be influenced by sound frequencies of a very low order for the response at the output to the oscilloscope or to the speaker is flat from zero frequency and to enough of the voice range of frequencies to give us a flat response curve over the range of frequencies. The curve will bend when the frequencies from the sound emitter go beyond the range for which the equipment was adjusted, but higher frequencies can be accommodated by changing the crystal size and spacing to make these lower than the wave length of the emitted sound.

It will be apparent that the embodiment shown is only exemplary and that various modifications can be made

We claim:

1. A method of measuring sound intensity, which method comprises: transmitting high-frequency acoustical energy from a first point to a second point; transmitting lower-frequency sound, the intensity of which is to be measured, over at least a portion of the path between said first point and said second point traversed by said high-frequency energy, thereby producing phase shifts in the high-frequency energy at said second point relative to the high-frequency energy at said first point; and measuring said phase shifts, said phase shifts being dependent upon the intensity of said low-frequency energy.

2. Means for detecting sound intensity, said means comprising in combination: a transmitter transducer and a receiver transducer, a source of energy at supersonic frequency connected to said transmitter transducer, said transducers being adapted so that said transmitter transducer propagates a supersonic signal to said receiver transducer; a source of relatively low frequency sound waves to be detected, said sound waves being emitted over at least a portion of the path between said transducers traversed by said supersonic signal, and means connected to said transducers and said source of energy at supersonic frequency for detecting the phase shifts in the signal received by said receiver transducer relative to the signal transmitted by said transmitter transducer, said phase shifts being dependent upon the intensity of said source of sound waves.

References Cited in the file of this patent

UNITED STATES PATENTS

| | | |
|---|---|---|
| 2,418,538 | Yetter | Apr. 8, 1947 |
| 2,612,772 | McConnell | Oct. 7, 1952 |
| 2,660,054 | Pringle | Nov. 24, 1953 |